(12) United States Patent
Chen et al.

(10) Patent No.: US 8,689,056 B2
(45) Date of Patent: Apr. 1, 2014

(54) METHOD AND SYSTEM FOR PROVIDING CUSTOMER SERVICE INFORMATION

(75) Inventors: Justin Chen, Chicago, IL (US); James Pratt, Granite Bay, CA (US); Greg M. Siino, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2976 days.

(21) Appl. No.: 11/263,147

(22) Filed: Oct. 31, 2005

(65) Prior Publication Data

US 2007/0101204 A1    May 3, 2007

(51) Int. Cl.
*G06F 11/00* (2006.01)

(52) U.S. Cl.
USPC ............................. 714/48; 717/174; 717/177

(58) Field of Classification Search
USPC .................................... 714/48; 717/174, 177
See application file for complete search history.

(56) References Cited

U.S. PATENT DOCUMENTS

| | | | |
|---|---|---|---|
| 6,601,190 B1 * | 7/2003 | Meyer et al. | 714/37 |
| 7,100,085 B2 * | 8/2006 | Miller | 714/26 |
| 7,134,049 B2 * | 11/2006 | Gillenwater et al. | 714/25 |
| 7,225,367 B2 * | 5/2007 | Hashem et al. | 714/48 |
| 7,457,991 B1 * | 11/2008 | Teague et al. | 714/47.1 |
| 7,500,144 B2 * | 3/2009 | Chessell et al. | 714/47.2 |
| 7,568,133 B1 * | 7/2009 | Bette et al. | 714/48 |
| 7,975,265 B2 * | 7/2011 | Schnoebelen et al. | 717/174 |

* cited by examiner

*Primary Examiner* — Marc Duncan

(57) ABSTRACT

A method and system for providing customer service information provide a central database containing software modules for tasks and services and configurations for the modules. Information is received specifying a procedure to be carried out. Software modules relating to tasks forming part of the procedure are invoked, and the information indicative of appropriate configurations for the specified procedure is passed to the software modules. The software modules access the configurations, and instantiate operational tasks applying the configurations. The operational tasks are consolidated into an operational procedure, and the operational procedure is provided to an operative.

29 Claims, 4 Drawing Sheets

METHOD AND SYSTEM FOR PROVIDING CUSTOMER SERVICE INFORMATION

BACKGROUND

Many organizations provide services to customers, which may include installation, configuration, repair, or maintenance of customer systems. A large service organization may have documented standard procedures for a number of standard service procedures. However, the procedures may be customized to meet the needs or wishes of specific customers, to meet the circumstances of specific geographic areas, or for other reasons.

In previous service-providing organizations, documentation has been mostly in static forms, such as word-processor documents. Documents generated by one part of the organization have not always been made available to other parts of the organization. For example, generic procedures may be documented by the engineers who design the systems to be serviced, while customer-specific customizations may be documented by customer-account personnel on a different continent. As a result, it has not always been easy for a representative or operative to be sure of having complete and up-to-date documentation for a procedure that is to be carried out. The representative or operative may be, for example, a salesperson, a service or maintenance engineer, or a member of the customer's own personnel.

SUMMARY

According to one embodiment of the invention, there are provided a method and system for providing customer service information to a central database containing software modules for tasks and services and configurations for the modules. Information is received specifying a procedure to be carried out. Software modules relating to tasks forming part of the procedure are invoked, and the information indicative of appropriate configurations for the specified procedure is passed to the software modules. The software modules access the configurations, and instantiate operational tasks applying the configurations. The operational tasks are consolidated into an operational procedure, and the operational procedure is provided to an operative.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

Reference will now be made in detail to various embodiments of the present invention, example of which is illustrated in the accompanying drawings.

Figure 1:
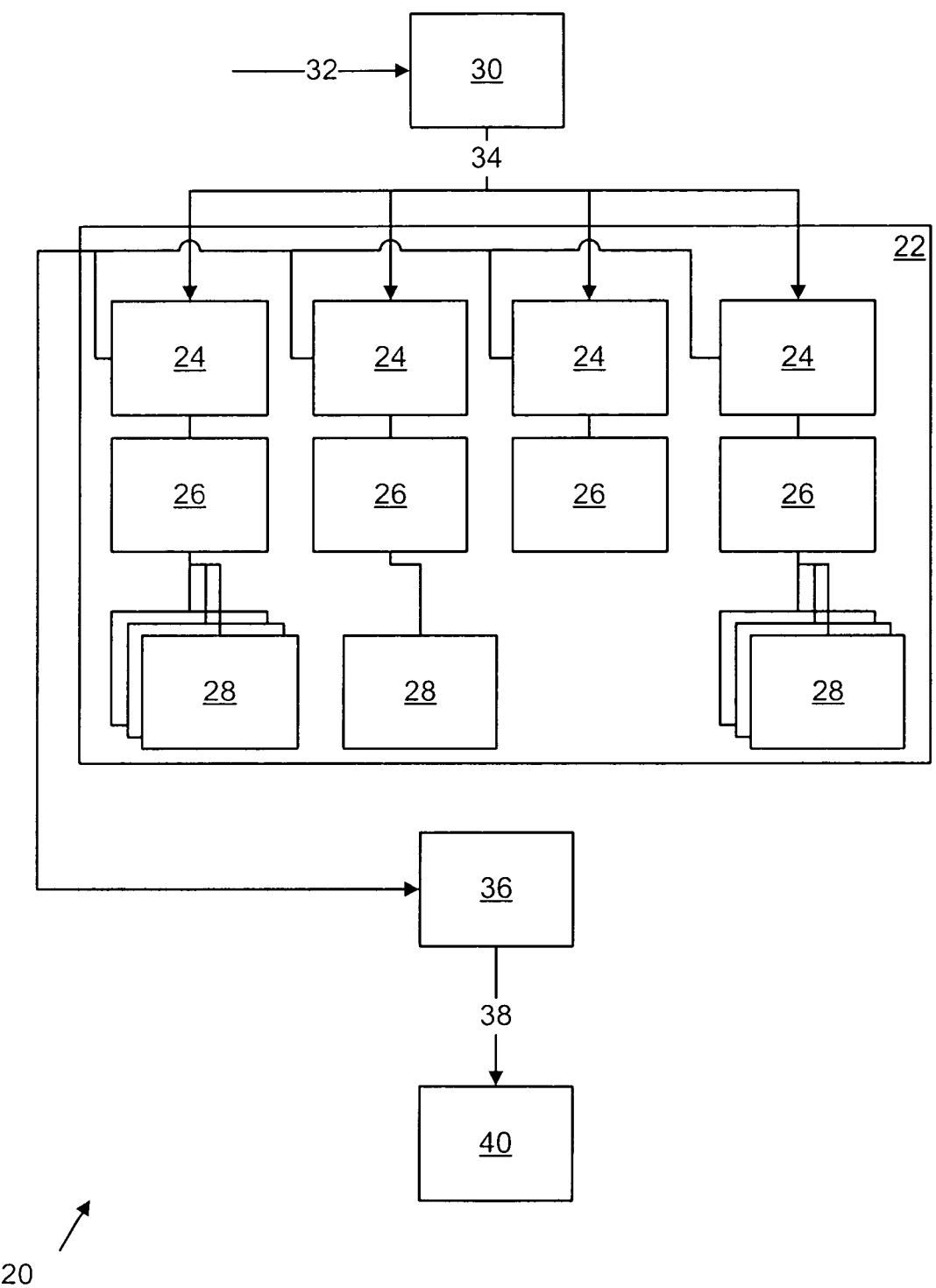
FIG. 1 is a block diagram of a first embodiment of a system according to an embodiment of the invention.

Referring to the drawings, and initially to FIG. 1, one embodiment of a system for providing customer service information is indicated generally by the reference numeral 20. The system 20 comprises a central database 22 containing software modules 24 for tasks and services, default configurations 26 for the modules, and custom configurations 28 for at least some modules.

An invoker module 30 receives information 32 specifying a procedure to be carried out. The information 32 includes information 34 indicating optional customizations to a default procedure. In response to the information 32, the invoker module 30 selects and invokes software modules 24 relating to tasks forming part of the procedure, and passes the information 34 indicating the customizations to the software modules 24.

The software modules 24 are arranged to access relevant custom configurations 28 as indicated by the customization information 34. If the customization information 34 does not indicate a custom configuration 28 for a software module 24, that software module 24 accesses the default configuration 26. The software module 24 then instantiates the operational task according to the chosen configuration 26, 28.

A task retriever 36 is arranged to receive instantiated tasks from the software modules 24, and to consolidate the operational tasks into an operational procedure 38 and to provide the operational procedure to an output device 40.

Figure 2:
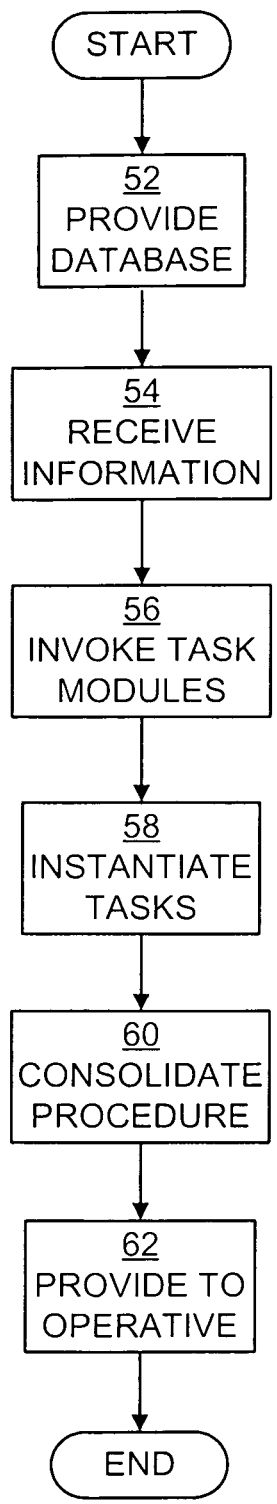
FIG. 2 is a flowchart of a first embodiment of a method according to an embodiment of the invention.

Referring now to FIG. 2, in one embodiment of a method of providing customer service information in step 52 a central database 22 is provided.

In step 54, information 32 specifying a procedure to be carried out is received.

In step 56, software modules 24 relating to tasks forming part of the procedure are invoked, and information 34 indicating the customizations is passed to the software modules.

In step 58, the software modules 24 access their default configurations 26 and relevant custom configurations 28, and instantiate operational tasks incorporating the configurations, including appropriate customizations.

In step 60, the operational tasks instantiated by the various software modules 24 are consolidated into an operational procedure 38. In step 62, the operational procedure 38 is provided to an operative who may be, for example, a salesperson, a service or maintenance engineer, or a member of the customer's own personnel.

Figure 3:
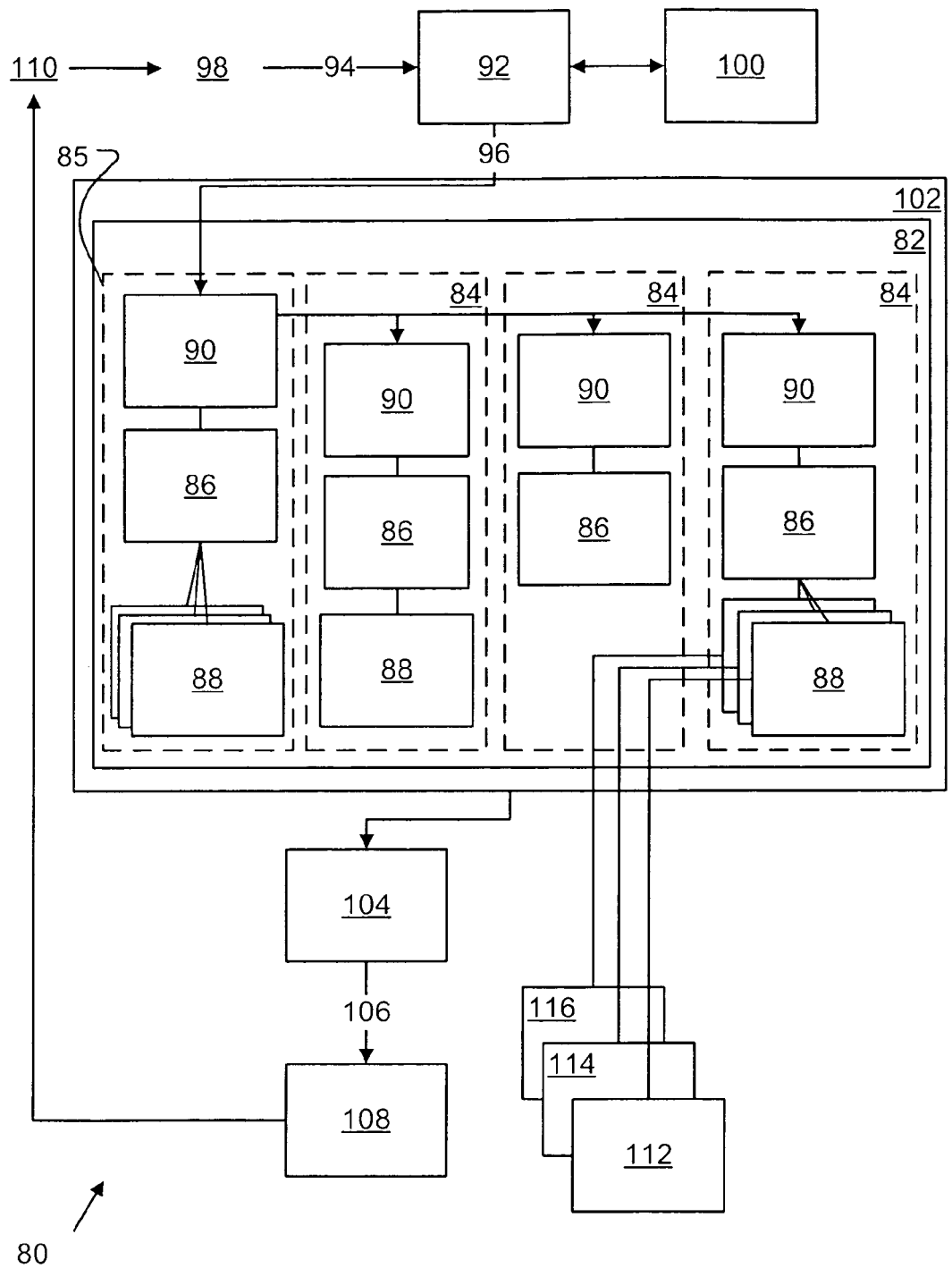
FIG. 3 is a block diagram of a second embodiment of a system according to an embodiment of the invention.

Referring now to FIG. 3, a second embodiment of a system for providing customer service information is indicated generally by the reference numeral 80. The system 80 comprises a central database 82 containing software objects 84 for tasks and software objects 85 for services, which comprise default configurations 86 for the objects, custom configurations 88 for at least some modules, and functional logic 90 that can select a correct configuration 86, 88 from appropriate input information and generate an instance of the task or service assigned to that object 24 using the selected configuration.

The system 80 also includes an invoker 92 that receives a customer request 94 specifying a procedure to be carried out. The customer request 94 includes information 96 indicating optional customizations to a default procedure. The customization information 96 may be, for example, information identifying a customer 98 for whom the procedure is to be carried out, in a system where some customers have special requirements. The customization information 96 may be, for example, information identifying a geographical region (not shown) where the procedure is to be carried out, in a system where some procedures vary from region to region. The customization information 96 need not be stated explicitly. For example, the invoker 92 may include a database 100 that links the identity of the customer 98 to the geographical location of the customer 98, or to information about the customer equipment on which the procedure is to be carried out.

The invoker 92 launches an object-oriented programming framework 102 that launches a procedure object 85. The procedure object 85 is selected on the basis of the customer request 94. The invoker 92 passes the customization information 96 to the selected procedure object 85. The customization information 96 is not necessarily passed in the same form as it is received. For example, where a geographical region is implied by the identity of the customer 98, the geographical region may be identified at an early stage and then passed as an explicit region code. The procedure object 85 includes a configuration database 86 of tasks that make up the procedure. The procedure object 85 passes to the object-oriented programming framework 102 the identities of the task objects 84 that make up the procedure, and the object-oriented programming framework 102 launches the appropriate task objects 84.

Alternatively, for a large or complicated procedure, more than one procedure object 85 be used. The framework 102 may then launch one procedure object 85, which may call one or more layers of further procedure objects 85, referred to as sub-procedure objects, before the task objects 84 are called. The procedure object 85 and any sub-procedure objects 85 may include customization configurations 88 where a customized procedure differs from the default procedure by including or excluding entire tasks, for example, where a task relates to optional equipment present in only some customer installations.

The object oriented programming framework 102 tracks the objects 84 that have been launched, determines when the objects have completed their activity, and shuts the objects down in an orderly manner.

The task objects 84 may include customization configurations 88. The task objects 84 are arranged to access relevant custom configurations 88 as indicated by the customization information 96. Where the customization information 96 does not indicate a custom configuration 88 for a task object 84, that task object accesses the default configuration 86. Specific customization information 96 may indicate custom configurations 88 for some task objects 84 but not for other task objects used in the same procedure.

Where there are two or more distinct categories of customization information 96, it may be possible for a task object 84 to select more than one customization configuration 88 for the same task. For example, there may be both customer-specific and geographical region-specific customization configurations 88. A procedure might then be requested by a customer who has a customer-specific customization configuration 88 in a geographical region that has a region-specific customization configuration 88 for the same task. The task object 84 may then include logic 90 for selecting a configuration. Where the customization configurations 88 are complete configurations replacing the default configuration 86 of the task object 84 entirely, the logic may simply apply an order of preference, for example, that a customer-specific customization configuration 88 overrides a region-specific customization configuration 88. Where a customization configuration 88 does not replace the whole default configuration 86, it may be possible to combine more than one customization into a single task. Alternatively, the task in question may be subdivided into discrete sub-tasks.

The task object 84 then instantiates the operational task according to the chosen configuration 86, 88.

A compilation engine 104 is arranged to receive instantiated tasks from the task objects 84, and to consolidate the operational tasks into an operational procedure 106 and to provide the operational procedure to an output device 108. The output device 108 may be, for example, a printer that produces a hard copy of the procedure, or a computer display on which the procedure 106 is displayed, or a storage device on which the procedure 106 is stored in machine-readable format for later access. The output is provided to a customer service operative 110, who may be, for example, a salesperson, a service or maintenance engineer, or a member of the customer's own personnel. The customer service operative 110 then carries out the procedure for the customer 98. The output may be in ephemeral form, to encourage the customer service operative 98 or other user to obtain a new copy from the system 80 whenever the procedure is to be carried out, thereby reducing the risk of the customer service operative using an out-of-date procedure.

The operational procedure 106 may be, for example, installation, server building or rebuilding, repair, maintenance, or monitoring. Where the operational procedure 106 is a continuing activity, such as routine maintenance or performance monitoring, the operational procedure 106 may have an explicit expiry date to encourage the user to regenerate the operational procedure 106 from the system 80, thereby benefiting from any updates that have been added to the database 82. Alternatively, when a configuration 86, 88 that affects a continuing operational procedure 106 is updated, the system 80 may be operated in response to the update, and an updated operational procedure 106 may be sent out to the customer service operative 110 without waiting for a new request from the customer 98 or the operative 110.

The task objects 84 may report to the compilation engine 104 what configurations 86, 88 were used. The compilation engine 104 may then generate a report for management or billing purposes quantifying the level of regional, customer-specific, or other customization in the procedure 106. For example, a customer who requires a high level of customer-specific customizations may be charged a higher fee than a customer whose requests can be met with standard procedures, to compensate for the extra work involved in creating, maintaining, and carrying out non-standard procedures. Also, it may be useful to know that a specific region uses many non-standard procedures.

To maintain the central database 82, each object 84 or configuration 86, 88 is "owned" by an entity 112 responsible for the information content of that object or configuration. An entity "owns" an object or configuration when that entity is responsible for creating and updating the object or configuration as appropriate and has control over changes to the object or configuration. For example, a customer-specific custom configuration 88 may be "owned" by a customer account team 114 responsible for the customer in question. For example, a region-specific custom configuration 88 may be "owned" by a regional office 116 responsible for the region in question. Because configurations 88 or objects 84 can be directly updated by the owners, and because a customer-support operative can generate a procedure 106 directly from the database 82, changes can be propagated from the owners 112 to the operatives quickly and reliably.

To ensure the consistency of the database 82, the custom configurations 88 for each task object 84 are derived from a master configuration. The master configuration may be the default configuration 86, or the default configuration 86 may also be derived from a master configuration (not shown). Consistency of the tasks, so that the procedure 106 is clear and self-consistent, can be ensured by including features necessary for consistency in the master configuration and prohibiting the owners of the custom configurations 88 from departing from those features of the master configuration. Those features may be made part of a formal definition of the task object 84. Alternatively, or in addition, the object 84 may be generated by derivation from a master object or higher level object (not shown) with derivation of those features in a manner that the owner of the lower level object has no power to override.

Figure 4:
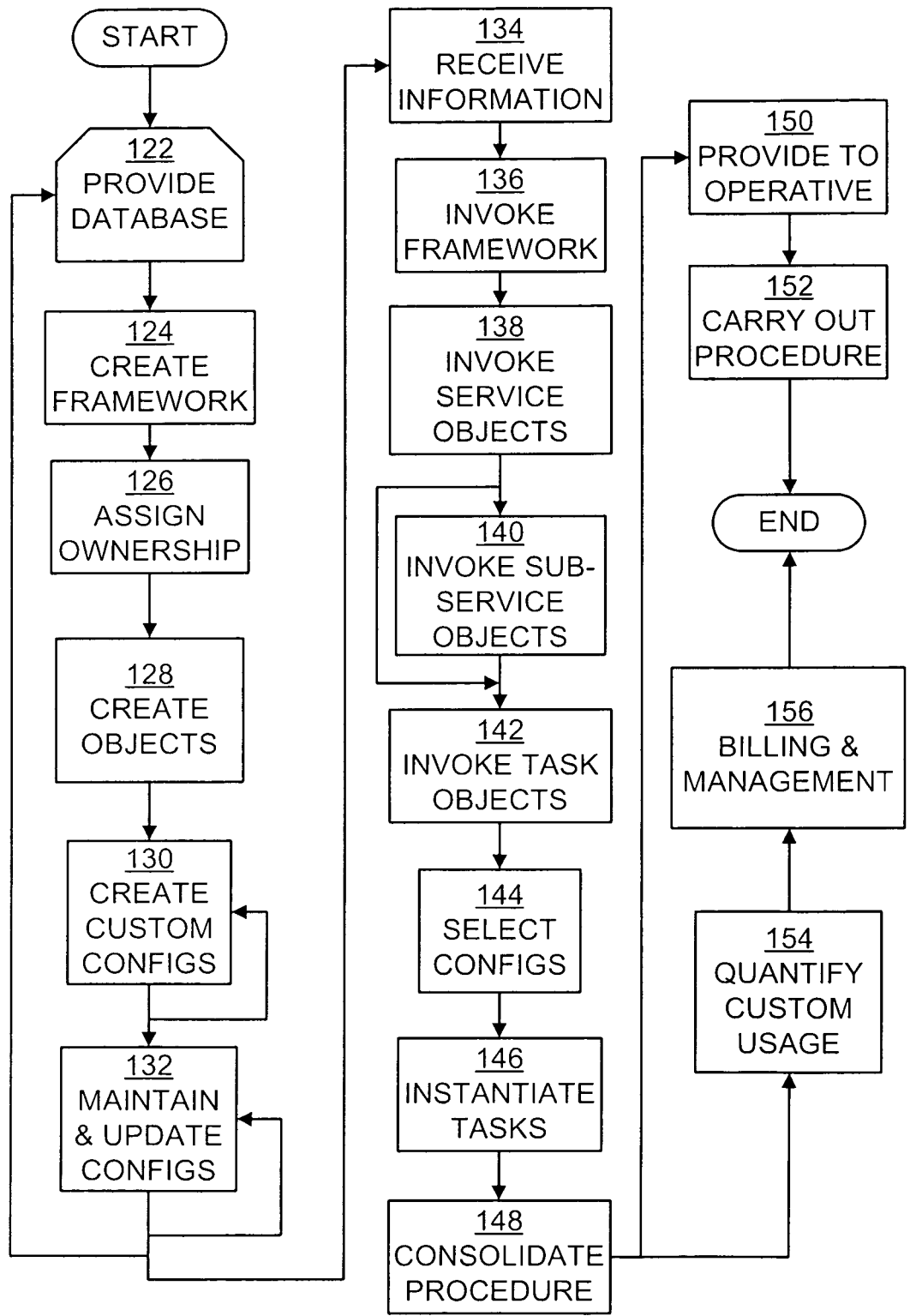
FIG. 4 is a flowchart of a second embodiment of a method according to an embodiment of the invention.

Referring now to FIG. 4 in conjunction with FIG. 3, in another embodiment of a method of providing customer service information, in step 122 a central database 22, 82 is provided. In order to provide the central database 22, 82, in step 124 an object-oriented programming framework is first created, within which task and procedure objects can be defined.

In step 126, ownership of the objects, and of configurations for the objects, is assigned to appropriate entities, who are thereafter responsible for creating and maintaining the objects and configurations. In step 128, new objects are created, and standard configurations are created for the objects. In step 130, custom configurations are created for objects, and are added to the database.

Although for clarity step 126 is shown separately from steps 128 and 130, the assignment of ownership may be closely related to the creation of objects or configurations. For example, if a new service or task is provided to support new equipment, the creation of the service or task object may be assigned to the developer of the new equipment as part of the development process. The developer may then provide the appropriate service or task object, and may provide a default configuration for the new object. Where the new object is a service object, the developer may provide new task objects invoked by the new service object. Alternatively, the new service may invoke existing task objects already used by other services, or may invoke a mixture of new and existing task objects. If a new custom configuration 88 is created for an existing object 84, 85 in step 130, then an owner may be assigned to the new configuration. For example, when a customer account team 114 or a regional office 116 desires a custom configuration 88 for an existing object 84, 85, then in step 130 the customer account team 114 or a regional office 116 may be assigned as owner of the custom configuration.

In step 132, the configurations are maintained and updated by their owners as appropriate.

In step 134, a customer service representative provides information 94 to the invoker 92 specifying a procedure to be carried out for a customer 98. In step 136, the invoker 92 invokes the object-oriented framework 102, specifying one or more service objects 85 indicated by the information 94.

In step 138, the framework 102 launches the specified service object 85, and passes customization information 96 to the service object. The service object 85 selects an appropriate custom configuration 88 or, if no custom configuration 88 is appropriate, selects the default configuration 86. The selected configuration 86, 88 indicates the tasks required to perform the service to which the service object 85 relates. In step 140, the service object 85 may request the framework 102 to invoke one or more sub-service objects 85, which in turn determine the tasks required.

In step 142, the service object 85 or sub-service objects 85 request the framework 102 to invoke the appropriate task objects 84 relating to tasks forming part of the procedure. The information 96 indicating customizations is passed to the task objects 84.

In step 144, the task objects 84 access the relevant custom configurations 88 indicated by the customization information 96 or, where no custom configuration 88 is appropriate, access the default configuration 86.

In step 146, the task objects 84 instantiate operational tasks in accordance with the selected configurations, including appropriate customizations where a custom configuration 88 has been selected. In step 148, the operational tasks instantiated by the various task objects 84 are consolidated into an operational procedure 106. In step 150, the operational procedure 106 is provided to a customer service operative 110, who may be the same as the representative who input the information 94, 96 in step 134.

In step 152, the operative 110 carries out the operational procedure 106 for the customer 98 in accordance with the procedure provided in step 150.

In step 154, information is provided by the task objects 84 indicating quantitatively the usage of custom configurations 88 in generating the operational procedure 106. The custom usage may be quantified by counting how many task objects 84 used custom configurations 88, either absolutely or in comparison to the number of task objects 84 that used default configurations 86. Other measurements may be used where appropriate. The information provided in step 154 may distinguish between different categories of custom configuration 88.

In step 156, the custom usage information from step 154 may be used for management purposes, for example, to monitor the level of region-specific customizations used in different regions, or for billing purposes, for example, to identify customers who cause higher than average costs by using large numbers of custom procedures.

Various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A computer implemented method of providing customer service information, comprising:
   providing a central database at said computer containing software modules for tasks and services, and configurations for the modules;
   receiving information specifying a procedure to be carried out at said computer;
   invoking software modules relating to tasks forming part of the procedure at said computer, and passing to the software modules information indicative of appropriate configurations for the specified procedure, the software modules accessing the configurations and instantiating operational tasks applying the configurations;
   consolidating the operational tasks into an operational procedure at said computer; and
   providing the operational procedure to an operative.

2. A computer implemented method according to claim 1, comprising:
   providing as the configurations default configurations for the modules defining a standard procedure and custom configurations for at least some modules;
   receiving in the information specifying a procedure to be carried out information indicating optional customizations to the standard procedure; and
   passing the information indicating the customizations to the software modules as the information indicative of appropriate configurations, the software modules accessing their default configurations and relevant custom configurations associated with the customizations.

3. A computer implemented method according to claim 2, comprising selecting standard configurations for the tasks so that the operational procedure is self-consistent, deriving the custom configurations from the corresponding standard configurations, and constraining the custom configurations to prevent loss of self-consistency.

4. A computer implemented method according to claim 2, comprising providing configurations customized for specific customers and receiving information identifying a customer in the information indicating optional customizations.

5. A computer implemented method according to claim 2, comprising providing configurations customized for specific geographical areas, and receiving information identifying a geographical area in the information indicating optional customizations.

6. A computer implemented method according to claim 2, wherein the custom configurations comprise configurations customized for two or more distinct categories of information indicating the customizations, and wherein the software modules include rules for selecting prevailing custom configurations.

7. A computer implemented method according to claim 2, further comprising quantifying the usage of custom configurations in the procedure.

8. A computer implemented method according to claim 1, comprising defining the software modules and associated configurations as objects in an object-oriented programming framework.

9. A computer implemented method according to claim 8, wherein invoking the software modules comprises invoking the object-oriented programming framework, wherein the framework initiates and closes down the objects.

10. A computer implemented method according to claim 8, wherein invoking the software modules comprises invoking a service object and providing the service object with a configuration specifying the tasks associated with the service object.

11. A computer implemented method according to claim 1, comprising assigning ownership of the configurations to an entity responsible for maintaining the accuracy of the configurations.

12. A computer implemented method according to claim 1, comprising a representative receiving from a customer a request for a service, providing the information specifying a procedure to be carried out, and thereby invoking the software modules, and an operative receiving the operational procedure and providing the service to the customer.

13. A computer system for providing customer service information, comprising:
    a central database accessible from said computer containing software modules and configurations for the modules;
    said software modules including a service module relating to a procedure and task modules relating to tasks forming part of procedures, the service module arranged to receive information relating to the procedure to which the service module relates, to invoke the task modules relating to tasks forming part of the procedure to which the service module relates, and to pass the information to the task modules;
    the task modules being arranged to access configurations to instantiate operational tasks applying the configurations; and
    a compilation engine accessible by said computer arranged to consolidate the operational tasks into an operational procedure and to provide the operational procedure to an output device.

14. A computer system according to claim 13, wherein the configurations for the modules comprise default configurations and custom configurations, the information includes information indicating optional customizations to the procedure to which the service module relates, and the task modules are arranged to access default configurations or relevant custom configurations in response to the information.

15. A computer system according to claim 14, wherein the custom configurations comprise configurations customized for specific customers.

16. A computer system according to claim 14, wherein the custom configurations comprise configurations customized for specific geographical areas.

17. A computer system according to claim 14, wherein the custom configurations comprise configurations customized for two or more distinct categories of information indicating the customizations, and wherein the software modules include rules for selecting prevailing custom configurations.

18. A computer system according to claim 13, wherein the task modules and their associated configurations are defined as objects in an object-oriented programming framework.

19. A computer system according to claim 18, wherein the object-oriented programming framework is arranged to initiate and close down the objects.

20. A computer system according to claim 18, wherein the service module comprises a service object having a configuration specifying the tasks associated with the service object.

21. A computer system according to claim 18, further comprising sub-service objects that are invoked by the service object and that invoke the task objects.

22. A computer system according to claim 13, wherein master configurations for the tasks are selected so that the operational procedure is self-consistent, the configurations are derived from the corresponding master configurations, and customization of the configurations is constrained to prevent loss of self-consistency.

23. A computer system according to claim 13, comprising entities to which ownership of configurations are assigned, which entities are responsible for maintaining the accuracy of the configurations assigned to those entities.

24. A computer implemented method of providing a customer service database, comprising:
    defining service objects relating to service procedures to be provided to customers;
    providing configurations for the service objects, specifying tasks forming part of the service procedures;
    defining task objects relating to the tasks;
    providing default configurations for the task objects, wherein the task objects are arranged to instantiate operational tasks using the task configurations;
    providing custom configurations for said objects; and
    arranging the objects to select from among available said configurations;
    wherein the task objects are arranged to instantiate the operational tasks differently using the selected configurations.

25. A computer implemented method according to claim 24, comprising providing more than one custom configuration for a said object, and arranging the said object to select from among available custom configurations.

26. A computer implemented method according to claim 24, comprising assigning ownership of objects and configurations to entities responsible for creating the objects and configurations, and assigning responsibility for updating the objects and configurations to the owners.

27. A computer implemented method according to claim 24, comprising selecting standard configurations for the task objects so that the instantiated operational procedure is self-consistent, deriving the provided configurations from the corresponding standard configurations, and constraining the provided configurations to prevent loss of self-consistency.

28. A computer implemented system for providing customer service information, comprising:

service means for defining a procedure to be carried out for a customer;

task means for defining tasks forming part of procedures, the service means being for receiving information relating to the procedure to which the service means relates, for invoking the task means defining tasks forming part of the procedure defined by the service means, and for passing the information to the task means, the task means being for accessing configurations, and for instantiating operational tasks incorporating the configurations; and compiling means for consolidating the operational tasks into an operational procedure and for providing the operational procedure to an output device.

29. A computer implemented system according to claim 28, wherein the service means is for receiving said information including information indicating optional customizations, and the task means is for accessing default configurations or relevant custom configurations responsive to the information indicating optional customizations.

* * * * *